Figure 1:
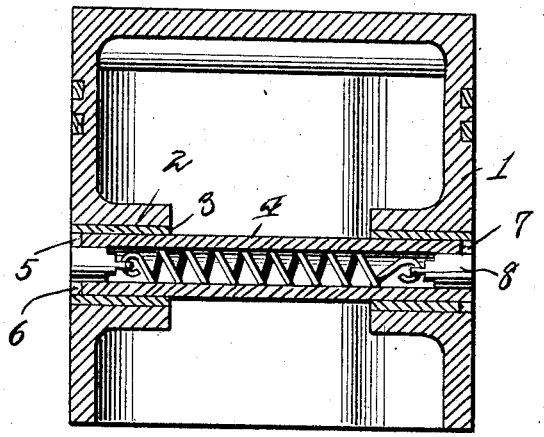

June 8, 1926.

L. BRANDT 1,587,752

EXPANSION WRIST PIN

Filed Sept. 14, 1922

Witness:

Inventor
LUTHER BRANDT.

By Richard B. Owen
Attorney

Patented June 8, 1926.

1,587,752

UNITED STATES PATENT OFFICE.

LUTHER BRANDT, OF BAY VILLAGE, OHIO, ASSIGNOR, BY MESNE ASSIGNMENTS, TO V. J. HARRIS, OF CLEVELAND, OHIO.

EXPANSION WRIST PIN.

Application filed September 14, 1922. Serial No. 588,275.

The present invention relates to improvements in pivot pins such as the wrist pin which forms the pivotal connection between a piston and its connecting rod. The object is to provide a pivot pin adapted to automatically adjust itself to the bearing within which it is mounted and the bearing portions of which pin automatically responds to take up for wear.

An object of importance is to provide an improved, simple, inexpensive and efficient wrist pin having expansible end bearing portions held yieldably under constraint to expand outwardly to the bearings within which they are mounted. A meritorious feature is the employment in a tubular pin of this character of expansible end bearing portions comprising relatively movable parts held under constant tension inwardly toward each other to produce radial expansion whereby the pin automatically responds to the bearings within which it is used and to the wear thereof.

With the above and numerous other objects in view which will appear as the description progresses the invention resides in such novel features of construction and in the combination and arrangement of parts as will be hereinafter more fully described and claimed.

In the drawing:—

Figure 2:
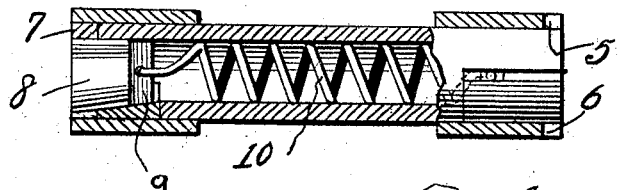
Figure 3:
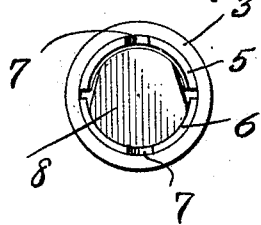
Figure 4:
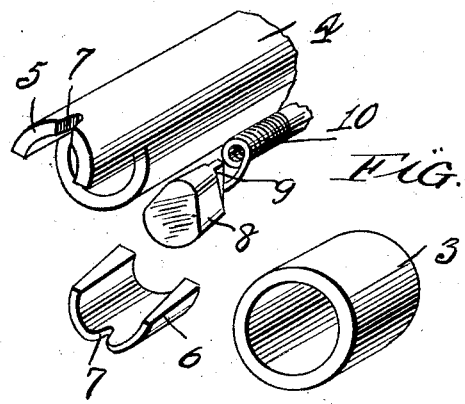

Figure 1 is a vertical section through a piston showing my wrist pin in longitudinal section attached thereto, Figure 2 is a longitudinal section through the wrist pin on an enlarged scale, one end thereof being shown in elevation, Figure 3 is an end elevation thereof, and Figure 4 is a disassembled perspective of one end of the wrist pin.

Referring to the drawing in detail, it will be seen that 1 designates a piston of conventional construction having the usual bearings 2 for receiving a wrist pin. As is customary, the bushings 3 are carried within the bearings 1 for receiving the wrist pin. My improved wrist pin consists of a tubular body 4 having its ends formed with extensions 5 adapted to co-act with the separable member 6 so as to form the extensions on the body 4, that is the ends of the wrist pin itself. The extension 5 and the detachable section 6 are notched as at 7 so that these notches will be approximately diametrically opposed to each other so that the amount of oil that is necessary may be delivered to the bushings 3. I now provide means for spreading or separating the detachable section 6 from the extension 5 so that a firm grip may be had upon the inner periphery of the bushings 3. This is accomplished by providing a pair of wedge shaped blocks 8 provided with plate extensions 9 at their inner ends to which are attached a coil spring 10 which normally tends to pull the wedge blocks 8 toward each other thereby causing the spreading or separating of the detachable sections 6 from the extension 5 which causes the wrist pin to firmly engage the interior of the bushings 3 as is desirable. It is to be further noted that the interior of the detachable sections 6 are inclined so as to contact with the wedge blocks 8.

It is thought that the construction and operation of the wrist pin will now be thoroughly understood without a more detail description thereof, but it is desired to point out however, that I have merely shown the preferred construction of the invention by way of example and that numerous changes in the details of construction and in the combination and arrangement of parts may be resorted to without departing from the spirit of the invention or the scope of the appended claims.

Having thus described my invention, what I claim is:—

1. In combination, a wrist pin body of tubular construction having extensions on its ends, semi-tubular in construction and detachable semi-tubular separable elements associated therewith, means within the body for spreading the separable elements from the extension in the manner and for the purpose specified, said means including a pair of wedge blocks situated between the extension and the separable elements, and a spring connecting said blocks.

2. A pin of the class described, comprising a tubular body having semi-tubular end parts, a movable semi-tubular end part complementary to each semi-tubular end part of the body, a wedge part between each end part of the body and its movable complementary end part, and a spring extending through the body connecting said wedge parts to exert tension thereon to spread the movable end parts radially outwardly with respect to the end parts of the body to increase the radial dimension of the pin at the ends.

3. In a pin of the class described, a tubular body provided with radially expansible end portions mounted within suitable bearings, each of which end portions comprises a part integral with the body and a complementary part movable longitudinally with respect to the integral end part of the body to increase the radial dimension of the end portion of the pin expanding it outwardly against the bearing within which it is mounted, and a spring extending through the tubular body connecting said movable end parts, holding them yieldably toward each other to expand the end portions of the pin radially.

4. A pin of the class described, comprising a tubular body having radially expansible end portions, each of which end portions consists of a part integral with the body and a co-operating part complementary thereto and movable with respect to the part integral with the body to increase the radial dimension of the end of the pin, and a spring extending through the tubular body connecting said movable end parts, holding them under yieldable tension to increase the radial dimension of each end portion of the pin.

5. A piston pin having expansible ends and a hollow body portion, in combination with an expanding device for each end and a spring housed within the hollow body portion and directly tensioned between said expanding devices.

6. A piston pin having a hollow body portion and expansive ends adapted to be received in bearings in opposite sides of a piston, in combination with a spring housed within the body portion and tensioned directly between said ends automatically expanding the same.

In testimony whereof I affix my signature.

LUTHER BRANDT.